Figure 1:
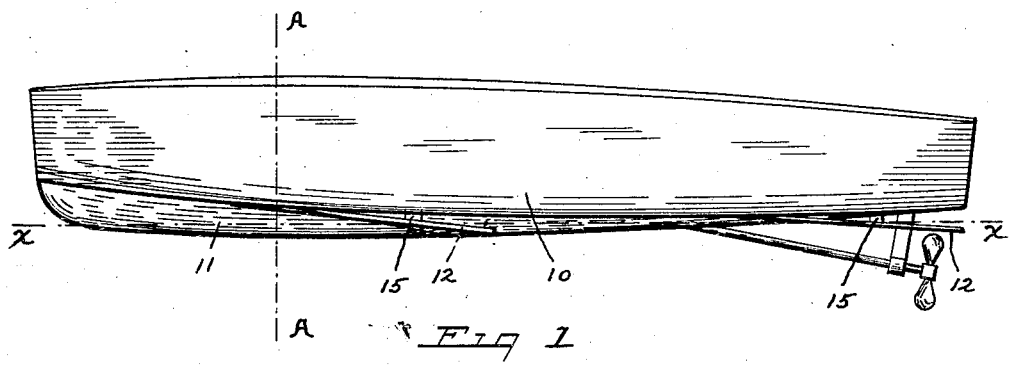

May 12, 1931.  T. L. DONALDSON  1,805,131
BOAT
Filed June 8, 1928    3 Sheets-Sheet 1

INVENTOR
Theodore Lewis Donaldson
BY
John J Thompson
ATTORNEY

May 12, 1931.  T. L. DONALDSON  1,805,131
BOAT
Filed June 8, 1928   3 Sheets-Sheet 2
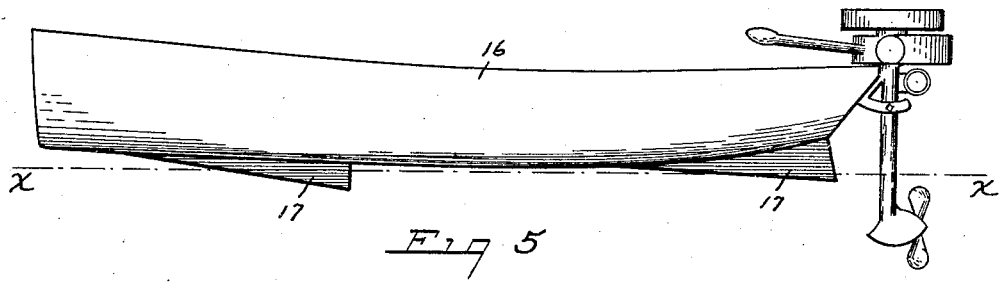
Fig 5
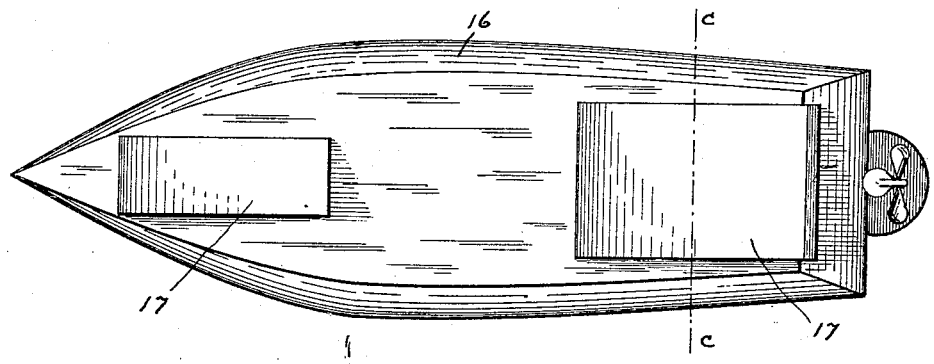
Fig 6
        
Fig 7        Fig 8        Fig 9
        
Fig 10       Fig 11       Fig 12
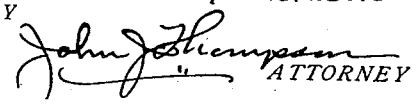
INVENTOR
Theodore Lewis Donaldson
BY
ATTORNEY

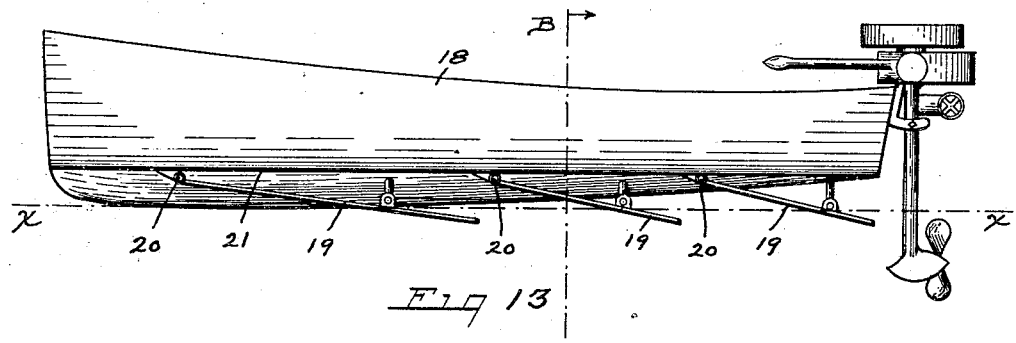
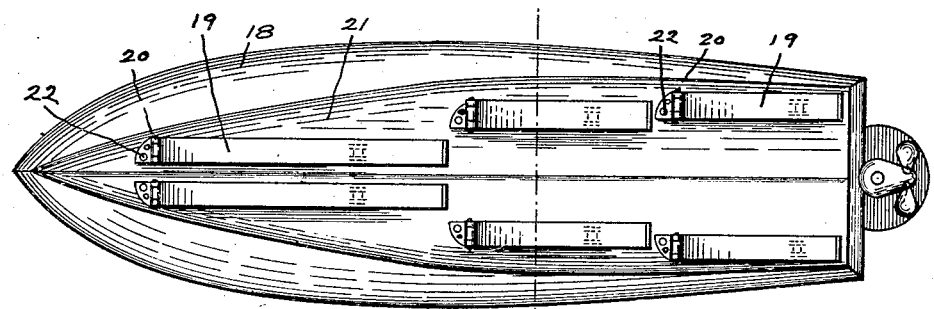
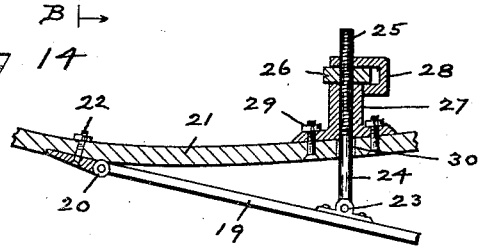
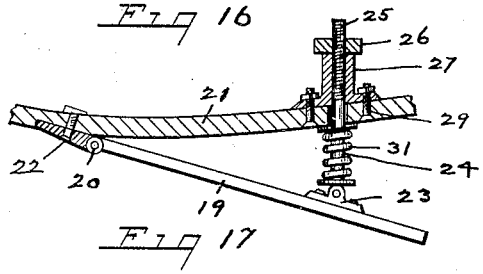
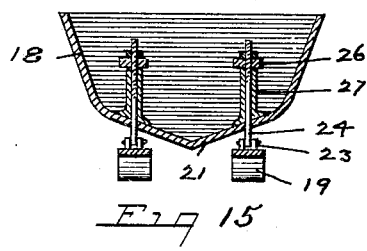

Patented May 12, 1931

1,805,131

UNITED STATES PATENT OFFICE

THEODORE LEWIS DONALDSON, OF POUGHKEEPSIE, NEW YORK, ASSIGNOR TO JACOB RUPPERT SCHALK, OF RHINEBECK, NEW YORK

BOAT

Application filed June 8, 1928. Serial No. 283,949.

This invention relates to a boat, and more particularly to that class known as speed or planing boats, adapted to be driven at a high rate of speed, whereby they skip or plane over the surface of the water.

While there have been boats of this class designed and used, they have many disadvantages owing to the shape of the hull which not only produces too great a surface friction when planing thus reducing the speed, and making the boat assume a dangerous angle liable to submerge the stern when getting under way, and at slow speeds.

Also boats of this class have been made with their bottoms arranged in steps or transverse and longitudinal steps, but this construction also produces great surface friction, or too much of the surface of the bottom of the boat in contact with the water when planing, and in this construction the bottom of the boat must be very strong requiring not only a heavy bottom, but well braced, all of which produces excessive weight, detracting from the speed as such a boat must be as light as possible, and still be very strong to withstand the impact as the boat hits the water in planing.

One of the objects of the invention is to construct a boat in which the planes are attached to the hull, thus eliminating the many and hard angles of construction when the planes are built into the hull.

Another object of the invention being, that by the use of attached planes, they can not only be attached to any boat, but the hull may be more rigid and simple in design and construction, making a cheaper boat.

A still further object being, that the planes can be either removed from the hull if desired, or folded flat against the hull, thus converting the boat into a displacement boat at will, and rendering it more seaworthy when not planing.

Also the angle of the planes with respect to the hull may be varied as desired, and the planes may be interchanged with others of different sizes and design as found suitable.

Furthermore with interchangeable planes, different material may be used in their construction.

With these and other objects in view, my invention consists in certain novel construction and combination of parts as will hereinafter be fully described and claimed, and further illustrated in the accompanying drawings which form a part hereof and in which like figures of reference refer to corresponding parts in all of the views, but it is fully understood that slight changes may be made without departing from the spirit of the invention.

In the drawings:—

Figure 1. shows a side elevation of a V-bottom boat, with the planes attached thereto.

Figure 2:
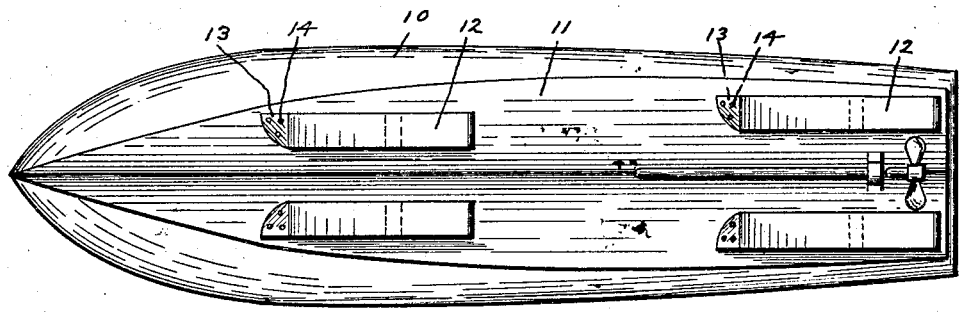

Figure 2. shows a bottom view of the same.

Figure 3:
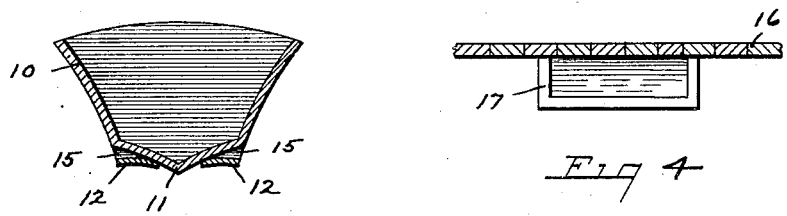

Figure 3. shows a cross section of the same on the line A—A of Figure 1.

Figure 4:

Figure 4. shows a cross sectional view of a modified form of plane, as employed in the construction shown in Figures 5 and 6.

Figure 5. shows a side elevation of a boat, using an outboard motor, and illustrating a modified form of plane.

Figure 6. shows a bottom view of the same.

Figures 7, 8, 9, 10, 11 and 12, are cross sections, showing different forms of planes, which may be used on any style of hull.

Figure 13. shows a side elevation of a round bottom boat, in which the planes are attached in an adjustable manner.

Figure 14. is a bottom view of the same.

Figure 15. is a cross sectional view of the same, taken on the line B—B of Figure 13.

Figure 16. is an enlarged sectional view of the style of plane shown in Figures 13, 14 and 15, showing the method of attaching the same to the bottom of the hull.

Figure 17. is a similar view, but showing a different adjusting means.

Figures 18 and 19. show different forms of planes.

Referring to the drawings, and particularly to Figures 1, 2 and 3, the V-bottom boat shown comprises the hull 10, formed with the V-shaped bottom 11, to which at suitable positions are secured the forward ends of a series of the rectangular planes 12; these planes 12 being here shown as curved or concave in cross section as in Figure 3, but which may be of any suitable shape, placed in any desired position, and of any desired number, and material.

The forward end of said planes 12 is rigidly secured to the bottom 11 of the boat by some suitable means such as bolts; the end of the plane being beveled to place the plane at an angle with the bottom; this angle depending on the size, shape, and other conditions of the boat; and the joints being covered with sheet copper 13 held by tacks or screws 14, to form a smooth joint.

At a suitable distance from the rear end of the planes is secured a block 15, between the plane 12 and the boat bottom 11, which supports the plane and allows the rear end a certain spring as it strikes the water to relieve the impact on the bottom of the boat.

In the modified form shown in Figures 4, 5 and 6, a flat bottom boat 16 is shown, having two planes 17, of box shape; the forward plane being narrow and the rear plane wide, but this may be varied, and any number, shape or style of plane used; some styles being shown in Figures 7 to 12 inclusive.

In the Figures 13, 14 and 15, is shown a round bottom boat 18, to which are attached a series of planes 19 in an adjustable manner; the forward ends of the planes 19 being secured to the bottom of the boat by the hinges 20, which are let into the bottom 21 as shown in Figures 16 and 17, to produce a smooth joint; said hinges 20 being secured in a suitable manner as by the bolts 22 to the boat, and formed on the planes 19, should the same be of metal as here shown.

At a suitable location toward the rear end of these planes 19 is placed a member 23, within which is pivoted the lower end of a rod 24; the upper portion of said rod 24 being formed with the threads 25 for an adjusting nut 26, which is mounted within a U-shaped housing 28 formed on the upper end of a bearing member 27, which is attached within the boat and to the bottom thereof by the bolts 29; allowing the rod 24 to extend upward through a hole 30 in the bottom of the boat, and in this manner the angle of the plane may be adjusted from inside the boat and during its operation.

In Figure 17, a modified form is shown, in which a spring 31 is placed on the rod 24, between the plane 19 and the boat bottom, and no housing 28 is used, thus allowing the rod 24 free upward movement against the action of the spring 31, but its downward movement being limited by the nut 26 which bears against the top of the bearing member 27.

Figures 18 and 19, are to show that the planes may be curved upward, and also may be made in steps if so desired.

Having thus described my invention, what I claim as new and desire to secure by Letters Patent, is:—

In a boat of the class described and in combination with a bottom and a keel, of a series of rectangular planes disposed each side of the keel in a staggered position and having their forward ends secured to the boat bottom, and their rear ends secured thereto at an angle therewith.

In testimony whereof I affix my signature.

THEODORE LEWIS DONALDSON.